(12) United States Patent
Endo (10) Patent No.: US 7,254,274 B2
(45) Date of Patent: Aug. 7, 2007

(54) IMAGE PROCESSING APPARATUS AND METHOD FOR EFFICIENTLY COMPRESSING AND ENCODING STILL IMAGES AND MOTION PICTURES

(75) Inventor: Yoshiyuki Endo, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 741 days.

(21) Appl. No.: 10/430,214

(22) Filed: May 7, 2003

(65) Prior Publication Data

US 2003/0210822 A1 Nov. 13, 2003

(30) Foreign Application Priority Data

May 10, 2002 (JP) ............... 2002-136020

(51) Int. Cl.
*G06K 9/36* (2006.01)
*G06K 9/46* (2006.01)

(52) U.S. Cl. .................. 382/239; 382/236

(58) Field of Classification Search ........ 382/236, 382/239, 248, 250; 348/333.01
See application file for complete search history.

(56) References Cited

U.S. PATENT DOCUMENTS 6,477,588 B1* 11/2002 Yerazunis et al. ............ 710/13
6,763,182 B1* 7/2004 Endo et al. ................. 386/124
6,977,673 B1* 12/2005 McKain et al. ........ 348/207.99

\* cited by examiner

*Primary Examiner*—Phuoc Tran
(74) *Attorney, Agent, or Firm*—Fitzpatrick, Cella, Harper & Scinto (57) ABSTRACT

An image processing apparatus includes an input unit for sequentially inputting image data and a display unit for displaying finder image data in the image data sequentially input from the input unit. The image processing apparatus also includes a processing unit that outputs encoded still-image data and the finder image data, the encoded still-image data being generated by compressing and encoding desired image data in the image data; an output unit for outputting the finder image data to the display unit; and a motion-picture compressing unit for compressing the finder image data into compressed and encoded motion-picture data and for outputting the compressed and encoded motion-picture data.

8 Claims, 9 Drawing Sheets

FIG. 1

PRIOR ART

FIG. 2

PRIOR ART

IMAGE PROCESSING APPARATUS AND METHOD FOR EFFICIENTLY COMPRESSING AND ENCODING STILL IMAGES AND MOTION PICTURES

BACKGROUND OF THE INVENTION

1. Field of the Invention

The present invention relates to an image processing apparatus and method for efficiently compressing and encoding still images and motion pictures. More particularly, it relates to a process for efficiently compressing and encoding motion pictures by adding a simple structure to an apparatus including a general-purpose digital camera integrated circuit (IC) having a function of compressing and encoding still images.

2. Description of the Related Art

Figure 1:
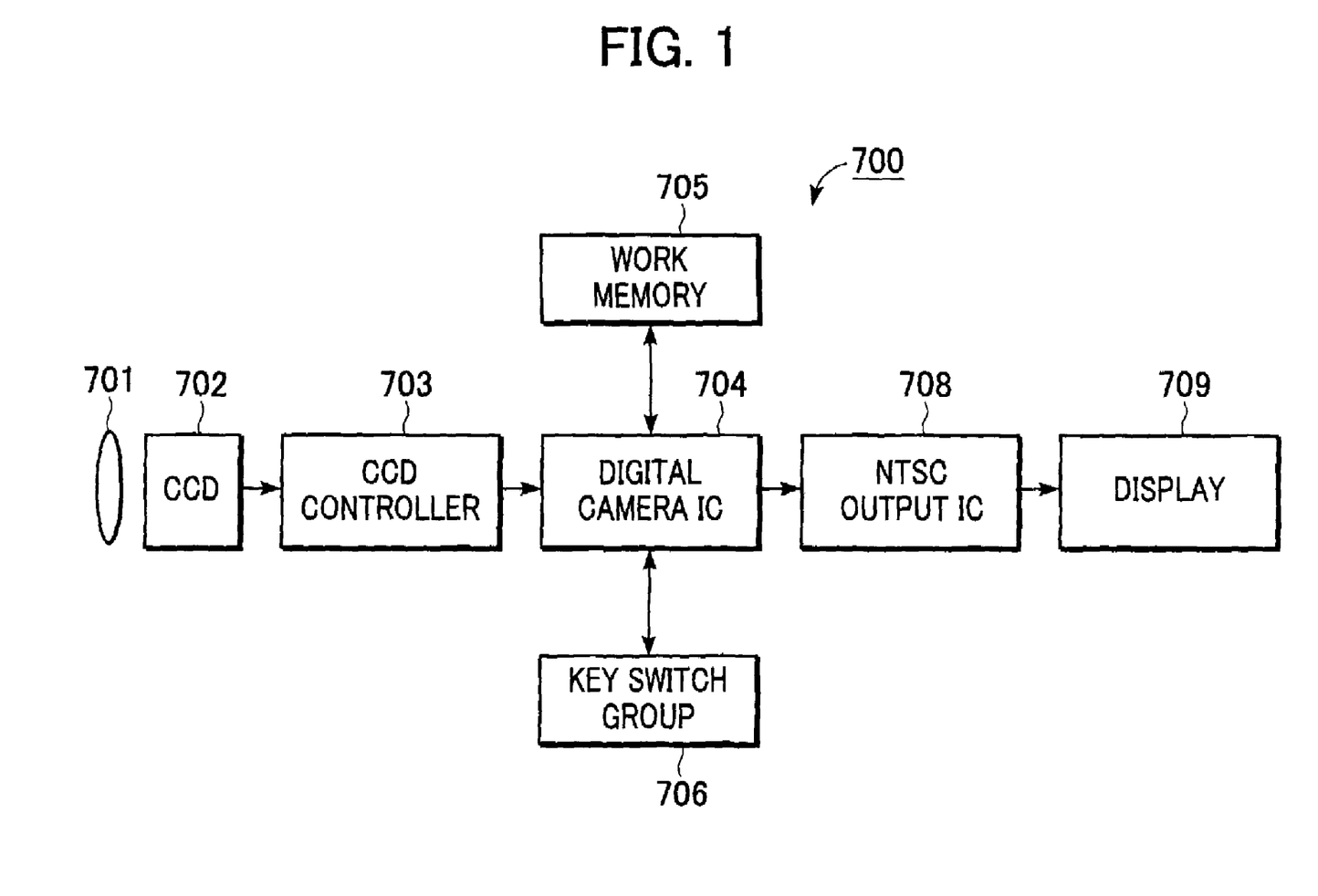
FIG. 1 is a block diagram showing the structure of a known digital camera.

An image processing apparatus 700 shown in FIG. 1 is an example of known compact portable equipment with a general-purpose digital camera IC (IC having a function of compressing still images to JPEG-format images (ISO/IEC 10918)) (JPEG is an abbreviation of joint photographic experts group).

Referring to FIG. 1, the image processing apparatus 700 includes a lens unit 701, a charge-coupled device (CCD) 702, a CCD control unit 703, a digital camera IC 704, a work memory 705, a key switch group 706, a NTSC output IC 708, and a display 709.

The lens unit 701 includes lenses having a fixed focus, zoom lenses having a predetermined magnification, and so on. The CCD 702 is a typical imager, the number of pixels of which is determined based on the resolution.

The CCD control unit 703 has a timing generator for supplying transfer clock and shutter signals to the CCD 702, a correlated double sampling/automatic gain control (CDS/AGC) circuit for eliminating noise and controlling gain for image signals from the CCD 702, an A/D converter for converting analog image signals into 10-bit digital data, and so on (these components are hereinafter also referred to as a CDS/AGC and AD converter).

Image data is constantly output from the CCD control unit 703 at a rate of 30 frames per second (fps).

The digital camera IC 704 performs image processing, such as white balance adjustment and control of the shutter speed and the aperture, on the image data from the CCD control unit 703 and converts the processed image data into digital data having a luminance (Y) and chrominance (Cb and Cr) format to output the digital data to the NTSC output IC 708. The digital camera IC 704 has a function of compressing captured image data to the JPEG-format data, which is then output to the NTSC output IC 708.

The work memory 705 for a work area required for the above processing and the key switch group 706 including a shutter switch, a mode switch, and the like are connected to the digital camera IC 704.

Since NTSC signals are generally output for display, the NTSC output IC 708 for outputting the signals to the display 709 serving as display means is connected to the digital camera IC 704.

The following two processes performed in the image processing apparatus 700 will now be described:
(1) a display output process with the digital camera IC 704 and
(2) a motion-picture recording process with the digital camera IC 704.

(1) Display Output Process with the Digital Camera IC 704

The following describes a case in which the image processing apparatus 700 is ordinarily set to a finder mode, that is, a mode in which images are only displayed on the display 709, without the shutter switch in the key switch group 706 being depressed.

First, the light reflected from an object is incident on the CCD 702 from the lens unit 701.

The CCD 702 converts the light into electrical signals in accordance with a timing specified by the timing generator in the CCD control unit 703 to output the converted signals to the CCD control unit 703.

The CDS/AGC and AD converter in the CCD control unit 703 converts the electrical signals from the CCD 702 into digital data to supply the converted data to the digital camera IC 704.

The digital camera IC 704 calculates parameters, such as AE, AF, and AWB, from the digital data (image data) supplied from the CCD control unit 703 to supply these new parameters to the CCD control unit 703.

The digital camera IC 704 processes image data in accordance with the parameter settings to compress the image data to a pixel size appropriate for display and outputs the compressed data to the NTSC output IC 708.

The digital camera IC 704, having a digital output function, ordinarily outputs YCbCr-format (4:2:2) digital data at a rate of 30 fps, one frame having 640×480 dots (a dot rate of 13.5 MHz).

Since an apparatus with an ordinary digital camera IC mainly uses display means conforming to the NTSC format, most digital camera ICs are constructed so as to not only output digital data but also display the NTSC-format image data.

Accordingly, the NTSC output IC 708 converts the NTSC signals from the digital camera IC 704 into the image data that is displayed on the display 709.

(2) Motion-picture Recording Process with the Digital Camera IC 704

When the shutter switch in the key switch group 706 is depressed while the image processing apparatus 700 is set to a motion-picture recording mode, the digital camera IC 704 compresses image data from the CCD control unit 703 into the JPEG format, generates a JPEG file and records it in the work memory 705, as in the finder mode described in section (1) Display Output Process with the Digital Camera IC 704.

The above processing is continuously performed while the shutter switch is being depressed. However, the capacity of the work memory 705 is limited. Therefore, limited specifications, such as the size of the image data to be recorded being not larger than the video graphics array (VGA) size (640×480 pixels), the frame rate being not higher than 15 fps, and the continuous photographing period being limited 30 seconds, are provided.

Figure 2:
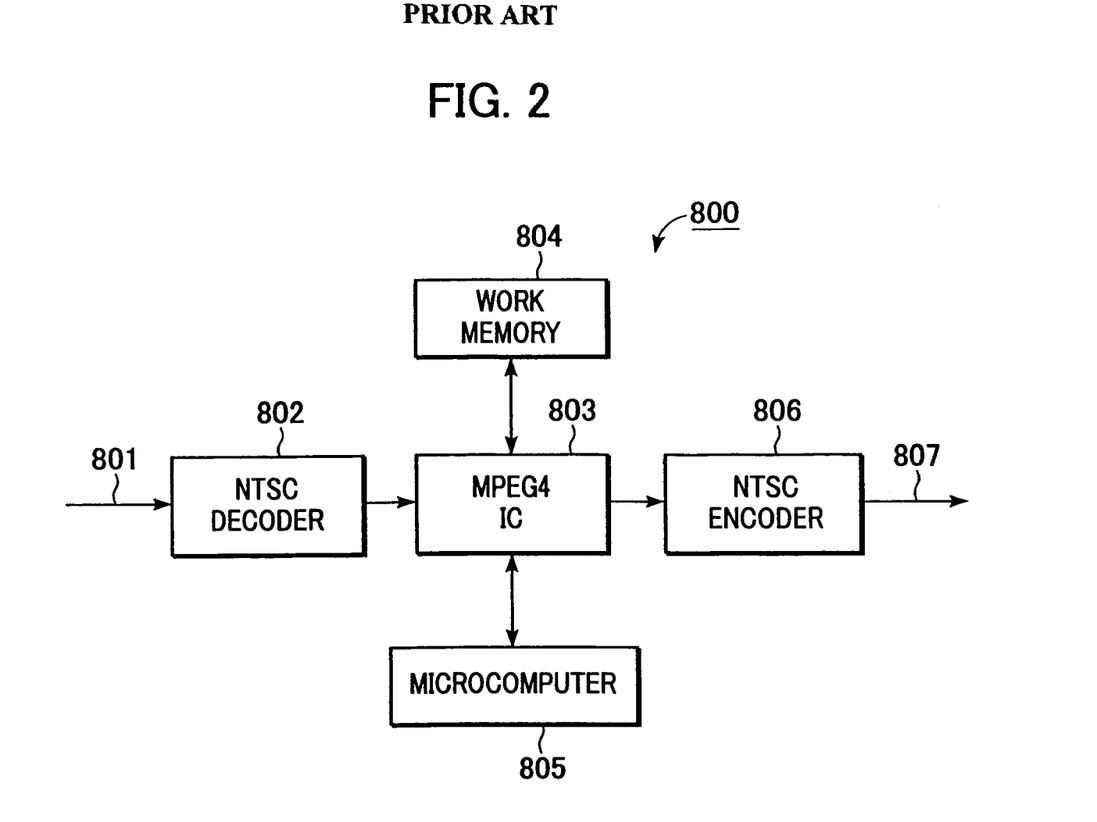
FIG. 2 is a block diagram showing the structure of a known motion-picture capturing apparatus.

When the NTSC signals supplied from the image processing apparatus 700 (the output signals from the NTSC output IC 708) are input to a motion-picture capturing apparatus 800 in FIG. 2 with an MPEG4 IC including a coder/decoder (CODEC) conforming to the MPEG-4 standards (ISO/IEC 14496) (MPEG is an abbreviation of moving picture experts group), the motion-picture capturing apparatus 800 performs the following processing.

An encoding process conforming to the MPEG-4 standards is characterized in that motion pictures can be edited in encoded bit streams by encoding images for every object. Specifically, background images are encoded in accordance with a conventional encoding system for rectangular motion pictures, whereas foreground object images are encoded in accordance with an object-based encoding system. In the object-based encoding system, shape information, as well as luminance and color information, are encoded.

In the motion-picture capturing apparatus 800, an NTSC signal 801 input from the outside (the image processing apparatus 700) is supplied to an NTSC decoder 802.

The NTSC decoder 802 converts the NTSC signal 801 into YCbCr digital image data (4:2:2) conforming to the CCIR-656 and supplies the converted image data to an MPEG4 IC 803.

The MPEG4 IC 803 compresses the YCbCr digital image data from the NTSC decoder 802 in a work memory 804 under the control of a microcomputer 805.

Since a monitor outputs the YCbCr digital data (4:2:2) during compression processing and an MPEG-4 compressed file contains the YCbCr digital data, as for the input to the MPEG4 IC, an NTSC encoder 806 converts the YCbCr digital data into NTSC signals and supplies them as an NTSC output 807 to a television receiver or the like through an external terminal.

The microcomputer 805 controls, for example, the mode setting of the MPEG4 IC 803 based on key inputs by a user or the like.

In known compact portable equipment having a digital camera function, such as the image processing apparatus 700 in FIG. 1, when the motion pictures are compressed to a motion-JPEG format for recording, the amount of data per frame is very high owing to the low compression rate of the motion pictures. Hence, the resolution and the frame rate of the motion pictures are restricted because of the limited capacity of a work area or a detachable storage medium, such as a compact flash (CF) card or a secure digital (SD) card, and thus motion pictures can be captured only for a short period.

Accordingly, an image recording methods conforming to the MPEG-4 encoding system or the like are being adopted instead of the motion-JPEG image recording method. Since a known digital camera IC as shown in FIG. 1 is constructed so as to output only analog NTSC signals or an image file compressed to the JPEG format (JPEG file), it cannot produce the YCbCr-format image data required for the MPEG-4 compression.

Furthermore, a decoding IC only for the NTSC signals is necessary to generate the TCbCr-format image data from the NTSC signals.

SUMMARY OF THE INVENTION

It is an object of the present invention to provide an image processing apparatus and method that can efficiently compress and encode both still images and motion pictures with a simple structure.

The present invention provides, in its first aspect, an image processing apparatus including an input unit for sequentially inputting image data and a display unit for displaying finder image data in the image data sequentially input from the input unit. The image processing apparatus also includes a processing unit that outputs encoded still-image data and the finder image data, the encoded still-image data being generated by compressing and encoding desired image-data in the image data; an output unit for outputting the finder image data to the display unit; and a motion-picture compressing unit for compressing the finder image data into compressed and encoded motion-picture data to output it.

The present invention provides, in its second aspect, an image processing method including the steps of sequentially inputting image data; outputting encoded still-image data that is generated by compressing and encoding desired image data in the image data and finder image data in the image data to be displayed on a display unit; outputting the finder image data to the display unit; and compressing the finder image data into compressed and encoded motion-picture data to output it.

Other objects, features, and advantages of the invention will become apparent from the following detailed description taken in conjunction with the accompanying drawings.

DESCRIPTION OF THE PREFERRED EMBODIMENTS

The embodiments of the present invention will now be described with reference to the attached drawings.

First Embodiment

Figure 3:
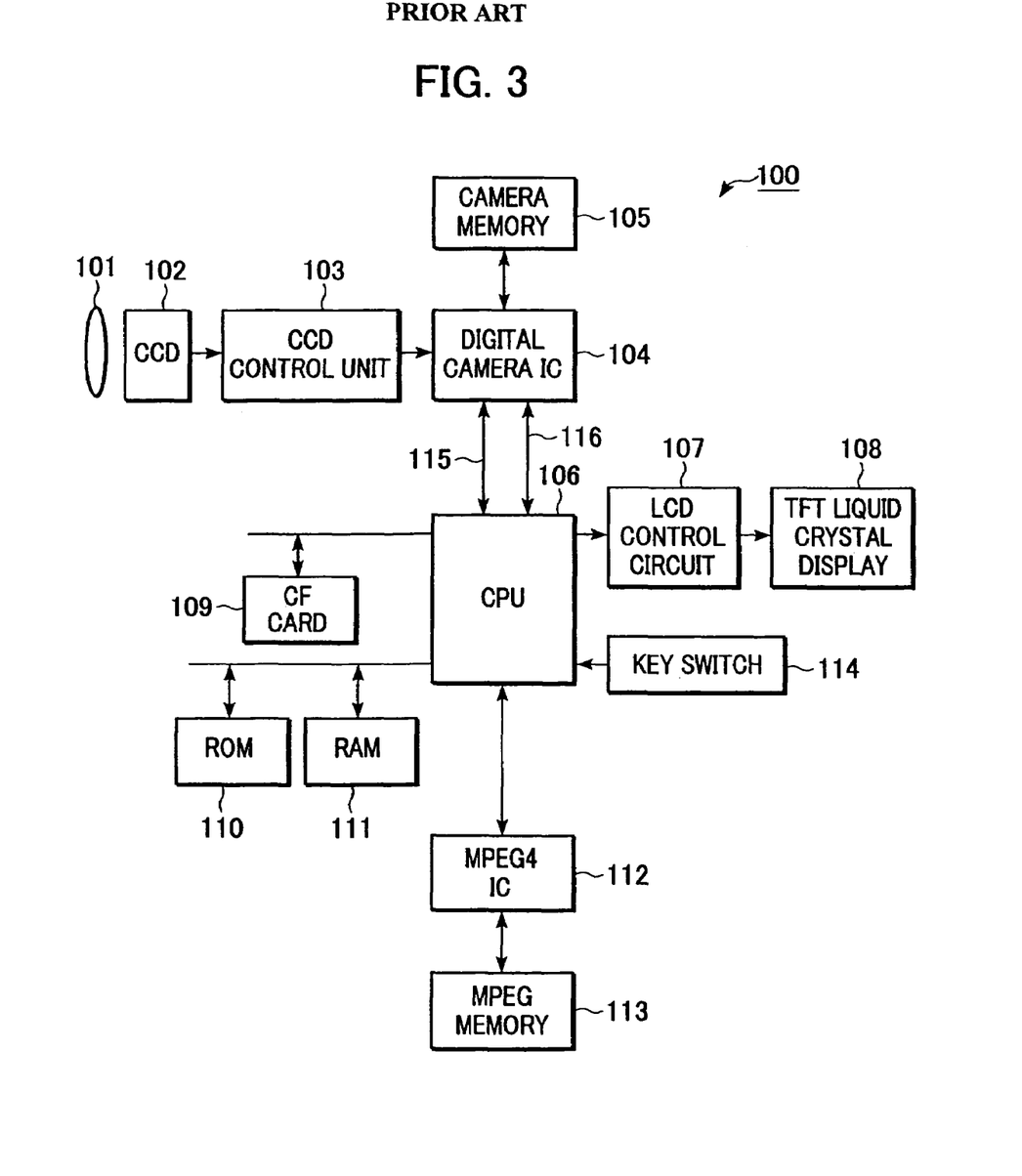
FIG. 3 is a block diagram showing the structure of an image processing apparatus according to a first embodiment of the present invention.

A first embodiment of the present invention is an image processing apparatus 100 shown in FIG. 3.

The image processing apparatus 100 of the first embodiment cuts out image data required for finder display from data that is supplied from a digital camera IC 104 and switches between conversion from the cut image data (effective image data) to a display data format and conversion from the cut image data to a data format that can be input to a compression IC at any size.

The structure and operation of the image processing apparatus 100 of the first embodiment will now be described.

Overall Structure of the Image Processing Apparatus 100

Referring to FIG. 3, the image processing apparatus 100 includes a lens unit 101, a CCD 102, a CCD control unit 103, the digital camera IC 104, a camera memory 105, a central processing unit (CPU) 106, a liquid crystal display (LCD)

control circuit 107, a thin film transistor (TFT) liquid crystal display 108, a CF card 109, a read only memory (ROM) 110, a random access memory (RAM) 111, an MPEG4 IC 112, an MPEG memory 113, a key switch 114, a camera data bus 115, and a JPEG data bus 116.

The lens unit 101 directs light reflected from an object to the CCD 102.

The CCD 102 converts the light into electrical signals (image signals of the subject) that is output to the CCD control unit 103.

The CCD control unit 103 includes a CDS/AGC and AD converter that converts the analog image signals from the CCD 102 into digital data (image data) and a timing generator that outputs timing signals for driving the CCD 102.

The digital camera IC 104 controls the exposure and white balance of the image data supplied from the CCD control unit 103 to output finder images (720×480 dots) generated from the image data and to generate a JPEG file of the captured image from the image data under the control of the CPU 106.

The camera memory 105 is, for example, a synchronous dynamic random access memory (SDRAM). It is connected to the digital camera IC 104 and is used for decompression of images in the generation of the JPEG file, resizing of images, and so on.

The CPU 106 is a so-called system on a chip (SOC) that incorporates not only a microprocessor but also logic (a YC-to-RGB converter 206 described below) for finder image signals and logic for a controller (a memory controller 208 described below) that controls an external memory, such as the ROM 110 and the RAM 111. The CPU 106 controls the operation of the overall image processing apparatus 100.

For example, the CPU 106 controls the digital camera IC 104 and display data that is supplied to the TFT liquid crystal display 108.

The LCD control circuit 107 generates signals for controlling the display of images on the TFT liquid crystal display 108 from RGB-format signals and synchronization signals supplied from the CPU 106 to output the generated signals. The TFT liquid crystal display 108 has, for example, a VGA screen size.

The CF card 109 serves as storage means and is connected to the CPU 106 through a dedicated bus with a connector.

The ROM 110 is connected to the CPU 106 through a memory bus. The ROM 110 is, for example, a flash memory or a mask ROM that stores control programs for controlling the image processing apparatus 100, font data, and so on.

The RAM 111 is connected to the CPU 106 through the memory bus. The RAM 111 is, for example, a static random access memory (SRAM) or an SDRAM, and is used as an area where images are decompressed or as a work area.

The MPEG4 IC 112 (ISO/IEC 14496) compresses YCbCr-format image data to be processed in accordance with the MPEG-4 encoding system and decompresses the compressed MPEG-4-format image data to the YCbCr-format image data.

The MPEG memory 113 is, for example, an SDRAM. It is used as a work area by the MPEG4 IC 112.

The key switch 114 detects the states of various control switches, such as a shutter switch and a mode switch.

The camera data bus 115 transmits finder image data from the digital camera IC 104 to the CPU 106.

The JPEG data bus 116 transmits the image data that is compressed in a JPEG format from the digital camera IC 104 to the CPU 106.

Internal Structure of the CPU 106

Figure 4:
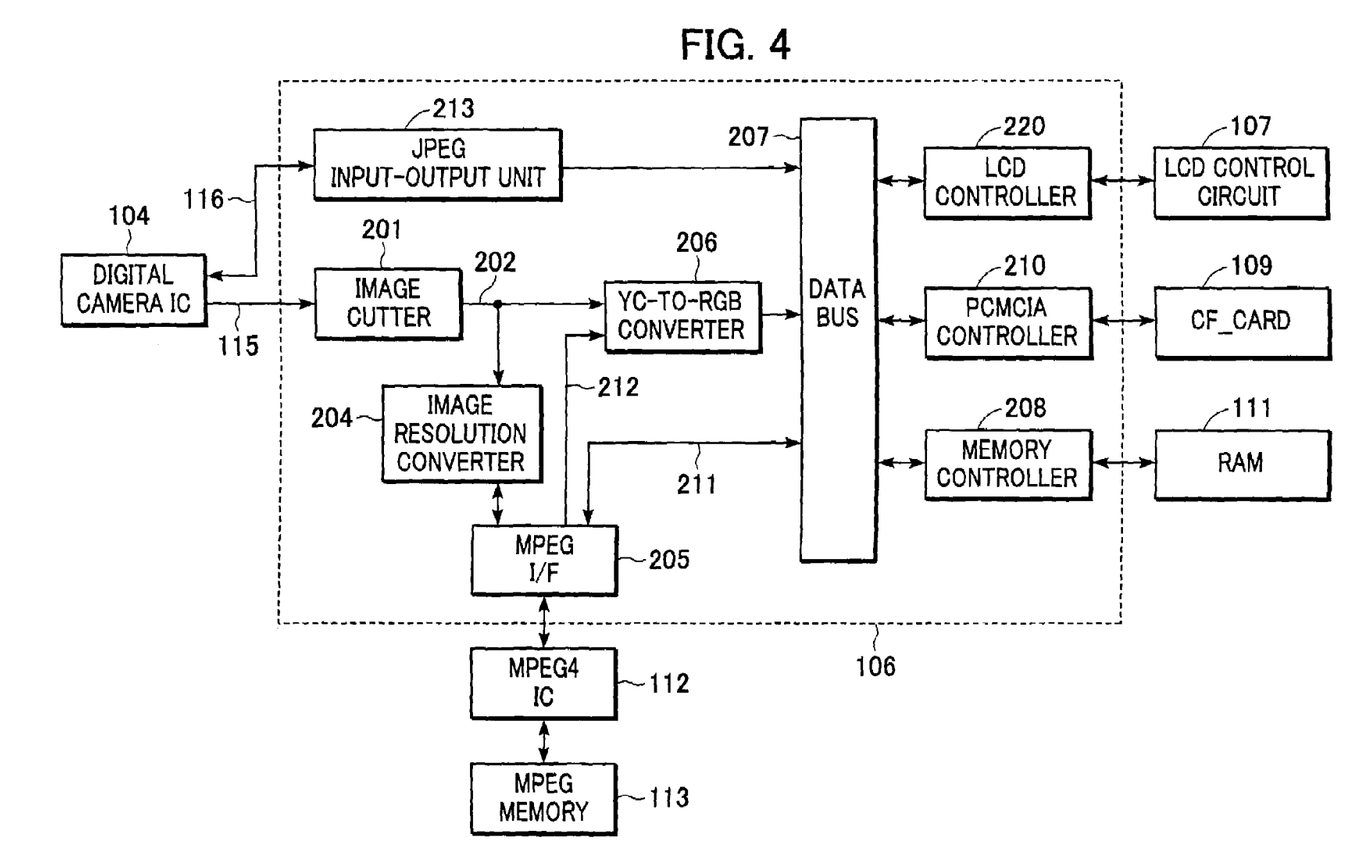
FIG. 4 is shows the internal structure of a CPU in the image processing apparatus in FIG. 3 and the data flow in the CPU.

FIG. 4 shows a partial internal structure of the CPU 106.

The CPU 106 includes an image cutter 201, an effective image data bus 202, an image resolution converter 204, an MPEG interface 205, the YC-to-RGB converter 206, a data bus 207, the memory controller 208, a personal computer memory card international association (PCMCIA) controller 210, an MPEG data bus 211, a decompressed image data bus 212, a JPEG input-output unit 213, and an LCD controller 220.

The image cutter 201 cuts out only effective data with the VGA size (640×480 dots) from the finder image data (YCbCr-format finder data of eight bits) that is supplied from the digital camera IC 104 through the camera data bus 115 and supplies the cut image data (effective image data) to both a display processor and an MPEG compression processor.

The finder image data includes data conforming to the CCIR-601 format or the CCIR-656 format.

The effective image data bus 202 transmits the YCbCr-format effective image data from the image cutter 201. The image resolution converter 204 compresses the image data that is supplied from the image cutter 201 through the effective image data bus 202 into images of any size.

The MPEG interface 205 transmits uncompressed (before compression or after decompression) YCbCr-format image data and compressed (after compression or before decompression) MPEG file to the MPEG4 IC 112.

The YC-to-RGB converter 206 selects as input data either the data (YCbCr-format image data) supplied from the image cutter 201 through the effective image data bus 202 or the data (YCbCr-format image data) supplied from the MPEG interface 205 through the decompressed image data bus 212. The YC-to-RGB converter 206 converts the selected YCbCr-format image data into RGB-format data and writes the converted RGB-format data onto predetermined addresses on the external RAM 111.

The data bus 207 is shared by plural processing segments in the CPU 106. The memory controller 208 controls the RAM 111 in accordance with data signals read from or written to the processing segments in the CPU 106. The PCMCIA controller 210 controls the CF card 109.

The MPEG data bus 211 transmits the MPEG file that is stored in the CF card 109 or the RAM 111 through the corresponding controller and the data bus 207 to the MPEG4 IC 112.

The decompressed image data bus 212 transmits the MPEG file that is supplied through the MPEG data bus 211 and the YCbCr-format image data that is output from the MPEG4 IC 112 at decompression time to the YC-to-RGB converter 206.

The JPEG input-output unit 213 receives the image data that is compressed into the JPEG format from the digital camera IC 104 through the JPEG data bus 116 and supplies the image data to the data bus 207.

Structure of the RAM 111

Figure 5:
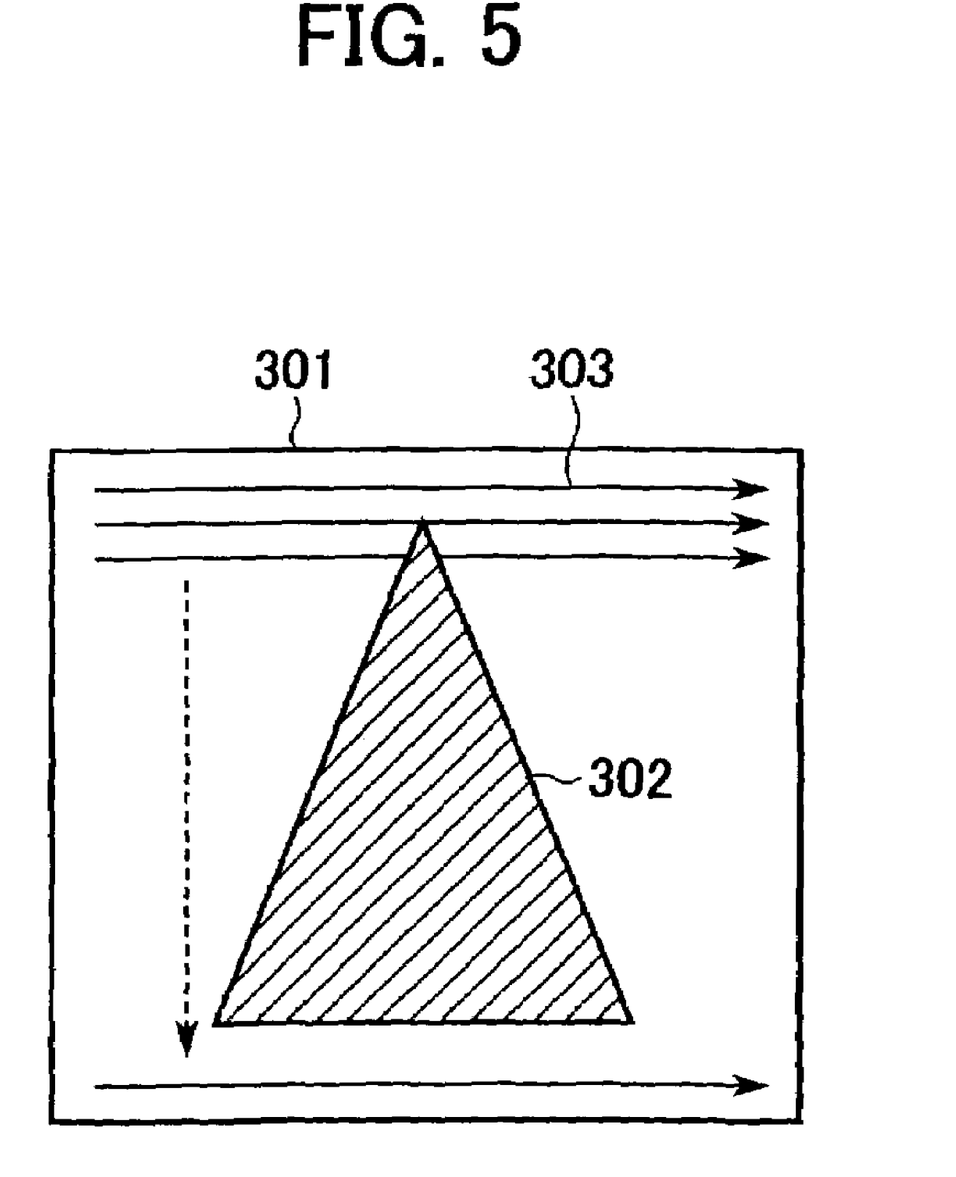
FIG. 5 is an illustration of a RAM (VRAM) in the image processing apparatus in FIG. 3.

FIG. 5 is a diagram showing an image drawn in a video random access memory (VRAM) area at predetermined addresses in the RAM 111 and the reading direction of the drawn image.

Referring to FIG. 5, an exemplary drawn image 302 is shown in a VRAM area 301. The drawn image 302 is 16-bit RGB-format data. The reading direction of the data from the VRAM area 301 is shown by arrows 303.

Operation of the Image Processing Apparatus 100

The operation of the image processing apparatus 100 will now be described with reference to FIGS. 3 to 5.

First, a user sets the image processing apparatus 100 to a still-image camera mode using the key switch 114.

The CPU 106 directs the digital camera IC 104 to output a finder image in response to the user operation.

The digital camera IC 104 sets information necessary for a register in the CCD control unit 103 in accordance with the direction from the CPU 106 and acquires the image data from the CCD control unit 103.

The digital camera IC 104 generates YCbCr-format finder image data (finder data) having 720×480 dots per screen in the camera memory 105 based on the image data from the CCD control unit 103 and outputs the finder data corresponding to 480 horizontal lines, each line having 720 dots.

The finder data from the digital camera IC 104 is processed at a rate of 30 frames (screens) per second. Namely, the CPU 106 processes the image data from the digital camera IC 104 in the following manner.

In the CPU 106, the image cutter 201 receives the finder data that is output every 720-dot horizontal line from the digital camera IC 104, cuts out 640-dot effective pixel data from the received 720-dot finder data, and transmits the cut image data as the effective image data through the effective image data bus 202.

Repeating the above cutting process for 480 lines allows only effective image data with the VGA size (640×480 dots) to be cut from the image data having 720×480 dots per frame.

Since motion pictures are not recorded in the still-image camera mode, the image resolution converter 204 is inactive.

The YC-to-RGB converter 206 converts the image data (YCbCr-format effective image data with the VGA size) in horizontal lines from the image cutter 201 into RGB-format data of 16 bits (five bits for red, six bits for green, and five bits for blue) to write the converted RGB-format data in the VRAM area 301 at predetermined addresses in the RAM 111 through the data bus 207 and the memory controller 208.

The above data processing is repeated during finder operation.

The TFT liquid crystal display 108 displays a finder screen or various data under the control of the LCD controller 220. The LCD controller 220 reads data corresponding to display pixels in horizontal lines at a rate of 50 frames per second from the VRAM area 310 at the predetermined addresses in the RAM 111 through the memory controller 208 to supply the read data to the LCD control circuit 107 as RGB-format data that can be displayed in the TFT liquid crystal display 108.

During the finder operation, when the user operates a release switch in the key switch 114, the digital camera IC 104 outputs image data compressed in the JPEG format. The output JPEG-format data passes through the JPEG data bus 116, JPEG input-output unit 213, the data bus 207, and the PCMCIA controller 210 to be recorded on the CF card 109.

When the user gives an instruction to take motion pictures by using the key switch 114 during the finder operation, the image resolution converter 204, which is inactive during the finder operation, is activated and the effective image data is supplied every horizontal line from the image cutter 201 to the image resolution converter 204.

The image resolution converter 204 acquires data corresponding to the number of pixels required for the MPEG compression from among the effective image data supplied from the image cutter 201.

For example, when the effective image data has the VGA size and the data corresponding to the number of pixels required for the MPEG compression has a quarter VGA (QVGA) size (320×240 dots), the image resolution converter 204 decimates two dots to one dot in the widthwise direction of the effective image data and decimates two lines to one line in the lengthwise direction of the effective image data to decrease the data in size from VGA to QVGA.

The image resolution converter 204 supplies the image data for the MPEG compression acquired in the manner described above in lines to the MPEG4 IC 112 through the MPEG interface 205.

The MPEG4 IC 112 supplies the image data every line from the MPEG interface 205 to the MPEG memory 113, which is used only for processing the MPEG-format data. The MPEG memory 113 generates data corresponding to one screen.

After the MPEG memory 113 generates the one-screen data, the MPEG4 IC 112 issues a command to the image resolution converter 204 through the MPEG interface 205 to prohibit the transfer of the image data for the next screen in order to compress the one-screen data before the update of the screen data.

After the MPEG4 IC 112 compresses the one-screen data, it issues a command that permits the image resolution converter 204 to transfer the image data for the next screen for updating the image data to be compressed.

The image resolution converter 204 transfers the image data for the next screen to the MPEG4 IC 112 upon receipt of the command to permit the transfer of the image data from the MPEG4 IC 112.

The MPEG4 IC 112 temporarily stores the compressed MPEG file acquired in the compression processing in the MPEG memory 113. When the stored volume of the data exceeds a predetermined value, the MPEG4 IC 112 writes the MPEG file on the CF card 109, serving as storage means, through the MPEG interface 205, the MPEG data bus 211, the data bus 207, and PCMCIA controller 210.

The MPEG file written on the CF card 109 is decompressed in the following manner.

The compressed MPEG data of a predetermined volume in the MPEG file stored in the CF card 109 is supplied to the MPEG4 IC 112 through the PCMCIA controller 210, the data bus 207, the MPEG data bus 211, and MPEG interface 205.

The MPEG4 IC 112 stores all the compressed MPEG data from the MPEG interface 205 in the MPEG memory 113 and starts to decompress the MPEG data. The MPEG4 IC 112 then supplies the decompressed MPEG data in the YCbCr-format (4:2:2) in horizontal lines to the YC-to-RGB converter 206 through the MPEG interface 205.

The YC-to-RGB converter 206 converts the YCbCr-format data from the MPEG4 IC 112 into the RGB-format data and writes the RGB-format data every horizontal line in the VRAM area 301 in the RAM 111 through the data bus 207 and the memory controller 208 in the same manner as for the finder data.

Second Embodiment

The image processing apparatus according to the first embodiment is constructed such that the image cutter 201 cuts out the effective image data from the finder data supplied from the digital camera IC 104 and then transfers the effective image data to both the YC-to-RGB converter 206 for image display and the image resolution converter 204 for MPEG compression. This structure is effective when the effective image area for image display is the same as that for compression. However, for example, when the effective image area for image display is different from that for compression, as in a case where a specified area in the display area is cut out in order to compress the image in the area, an image processing apparatus with the following structure is effective.

Figure 6:
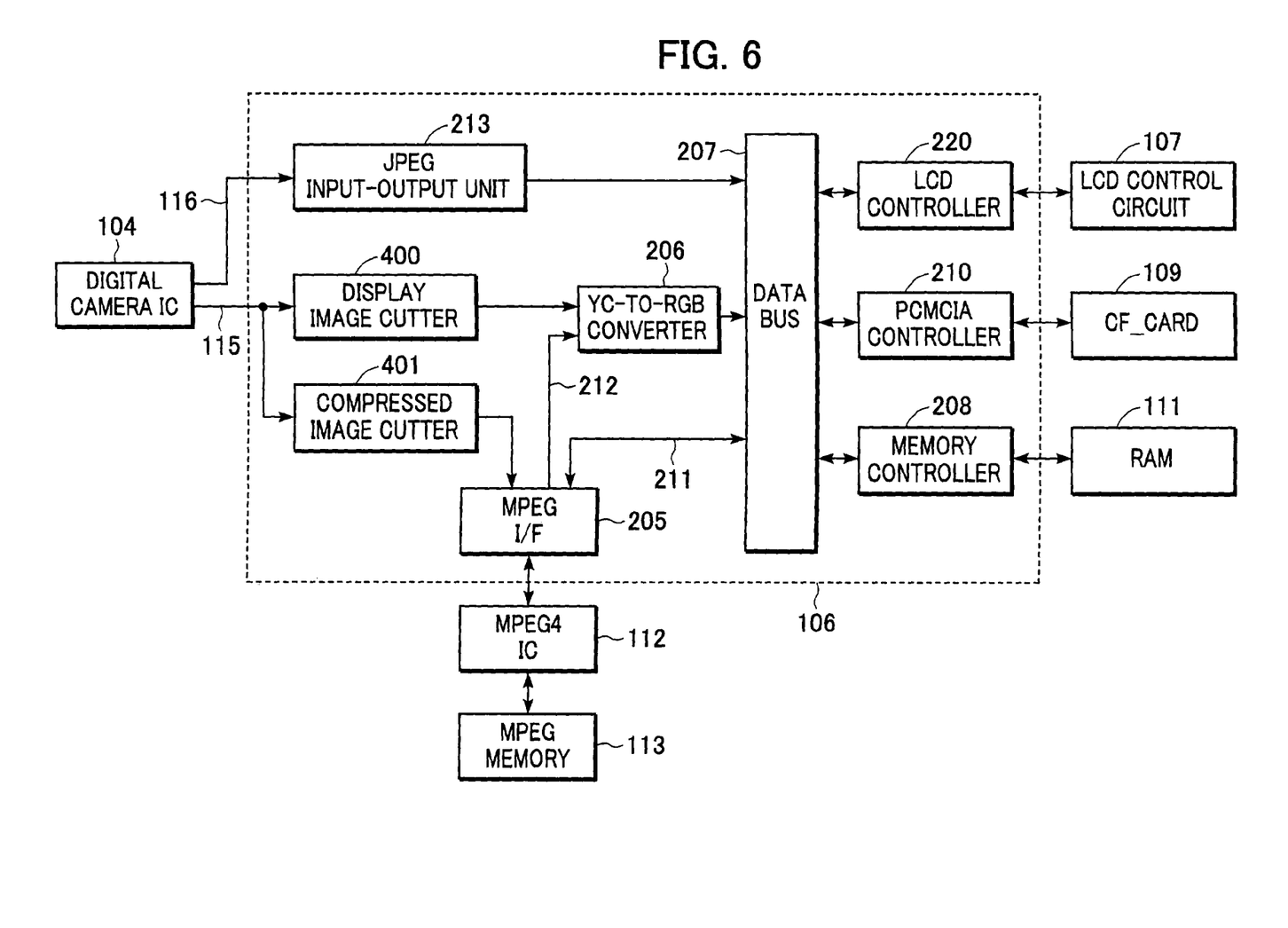
FIG. 6 shows the internal structure of a CPU according to a second embodiment of the present invention and the data flow in the CPU.

FIG. 6 shows the internal structure of a CPU 106 according to a second embodiment.

The CPU 106 of the second embodiment includes a display image cutter 400 and a compressed image cutter 401, unlike the CPU 106 of the first embodiment in FIG. 4. Only the differences from the first embodiment will now be described.

The display image cutter 400 cuts out an effective image area for image display from the finder data supplied from the digital camera IC 104. The compressed image cutter 401 cuts out an effective image area for image compression from the finder data supplied from digital camera IC 104.

In the first embodiment, the image data having 320×240 dots per screen, which is one-screen image data for compression, is generated by decimation from the image data having 640×480 dots per screen supplied from the image cutter 201. In contrast, in the second embodiment, the compressed image cutter 401 cuts out 320-dot image data starting from the dot data corresponding to a predetermined effective area in the finder data that is supplied from the digital camera IC 104 in horizontal lines to transfer the cut image data to the MPEG4 IC 112. Repeating this process for 240 lines produces one-screen image data for compression in the MPEG memory 113.

With the structure of the CPU 106 described above, although the image area to be compressed is decreased, compared with the first embodiment in which the length and width of the entire image are reduced by half (to one quarter in area ratio), the images can be favorably compressed because there is no image decimation.

Third Embodiment

In the first embodiment, the digital camera IC 104 in the image processing apparatus 100 in FIG. 4 generates the YCbCr-format digital data as the finder data to output it. When the digital camera IC 104 can output finder data only as commonly used NTSC signals, the following structure of the image processing apparatus 100 is effective.

Figure 7:
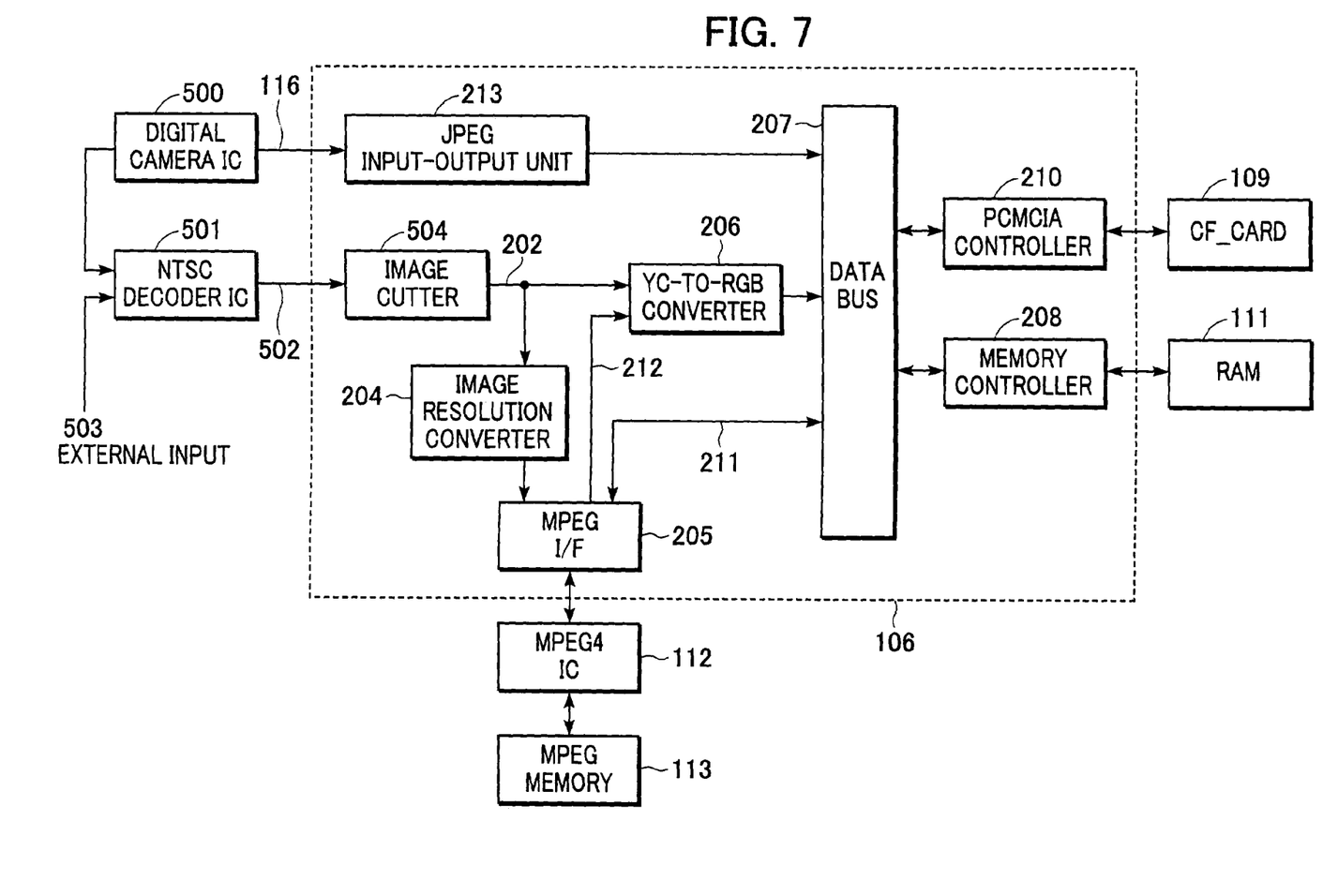
FIG. 7 shows the internal structure of a CPU according to a third embodiment of the present invention and the data flow in the CPU.

FIG. 7 shows the internal structure of a CPU 106 and a digital camera IC 500 according to a third embodiment, which can output the finder data only as NTSC signals.

The digital camera IC 500 of the third embodiment is connected to the CPU 106 through a NTSC decoder IC 501. An external input 503 is connected to the NTSC decoder IC 501.

The CPU 106 of the third embodiment differs from the CPU 106 of the first embodiment in FIG. 4 in that it includes an image cutter 504 connected to the NTSC decoder IC 501.

The digital camera IC 500 outputs the finder data as NTSC signals. The NTSC decoder IC 501 converts the NTSC finder data supplied from the digital camera IC 500 and the NTSC finder data supplied from the external input 503 (NTSC data supplied from an external television set or video set) into YCbCr-format data 502 (16-bit (4:2:2) data).

The image cutter 504 cuts out effective pixel data from the 16-bit YCbCr-format data supplied from the NTSC decoder IC 501.

In the first embodiment, the effective pixel data (effective image data) used for display and MPEG compression is cut from the data supplied from the digital camera IC 104 that can output the YCbCr-format data. In contrast, the image processing apparatus in the third embodiment includes the digital camera IC 500, which can output the finder data only as the NTSC signals. Hence, the NTSC data is input to the NTSC decoder IC 501 to generate YCbCr-format digital data that is input to the image cutter 504 to be processed.

Since most commonly-used NTSC decoder ICs accommodate multiple channels, providing the image processing apparatus 100 with input means for signals supplied from external equipment, such as a television set or a video set, allows images of TV programs and so on, in addition to images input from the video set, to be compressed for storage or to be decompressed.

Fourth Embodiment

Figure 8:
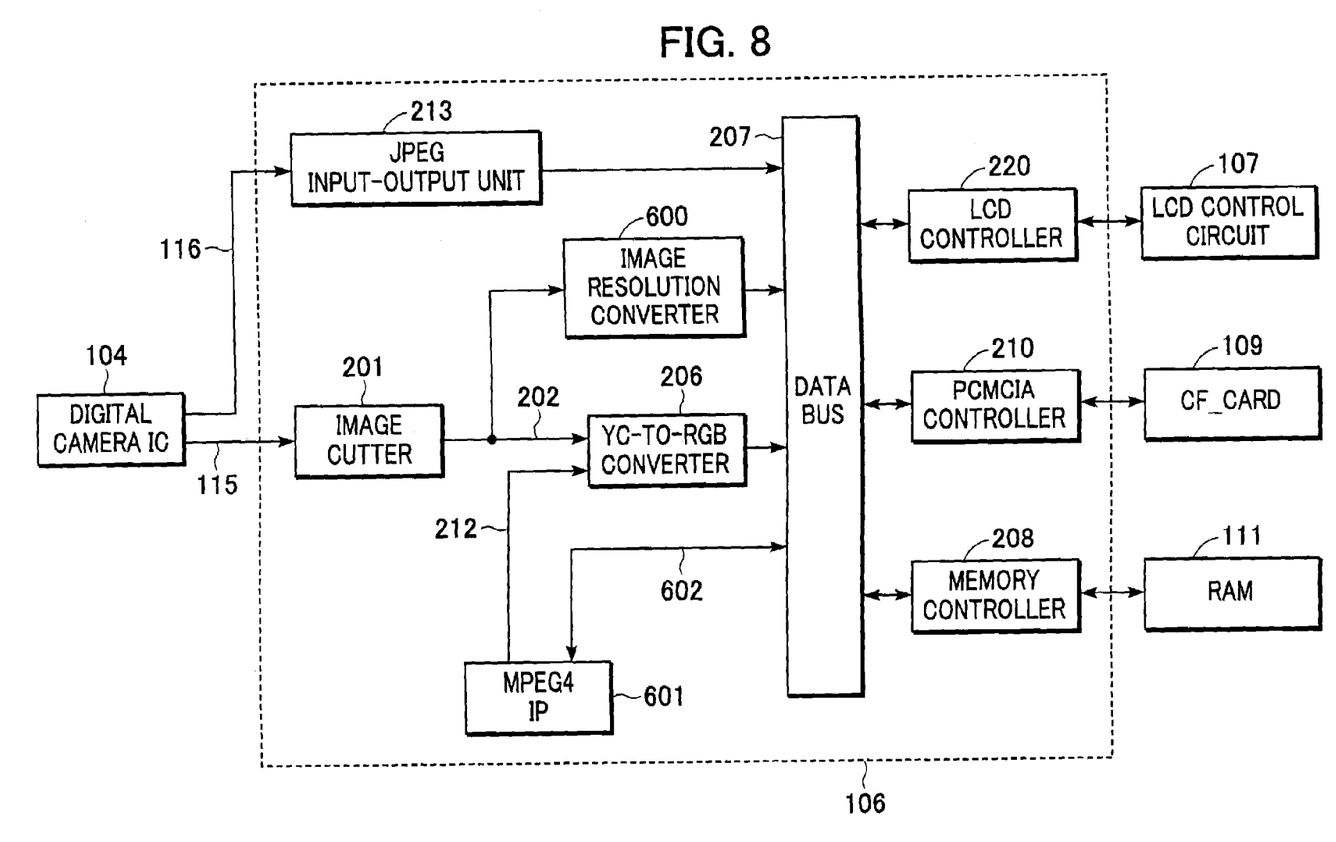
FIG. 8 shows the internal structure of a CPU according to a fourth embodiment of the present invention and the data flow in the CPU.

The CPU 106 of the first embodiment has the external MPEG4 IC 112, whereas the CPU 106 of a fourth embodiment incorporates the function of the MPEG4 IC 112, the function being supplied using available IP.

Referring to FIG. 8, the CPU 106 of the fourth embodiment has an MPEG4 IP 601 having the same function as the MPEG4 IC 112.

The MPEG4 IP 601 accesses an MPEG work area in the RAM 111 through a data bus 602 in the compression or decompression of the image data.

An image resolution converter 600 of the fourth embodiment decimates the finder data in horizontal lines from the image cutter 201 to a predetermined size and supplies the decimated finder data to the MPEG work area in the RAM 111 through the data bus 207 and the memory controller 208.

In the first embodiment, the one-screen data is generated in the MPEG memory 113 and is compressed and decompressed in a work area provided in the MPEG memory 113. In contrast, in the fourth embodiment, a work area for the MPEG4 IP 601 and an area where the one-screen data supplied from the image resolution converter 600 is stored are provided in the RAM 111, thus controlling the operation of both the CPU 106 and the MPEG4 IP 601 by using a single memory.

The object of the present invention is also achieved by the following manner; that is, a storage medium that stores program codes of software embodying the function of hosts and terminals according to the first to fourth embodiments is provided in a system or an apparatus, and a computer (or a CPU or a microprocessor unit (MPU)) of the system or the apparatus reads the program codes stored in the storage medium to execute them.

In such a case, the program codes themselves read from the storage medium realize the functions of the first to fourth embodiments, and the present invention applies to the storage medium storing the program codes and the program codes themselves.

Storage media for storing the program codes include a ROM, a flexible disk, a hard disk, an optical disc, a magneto-optical disc, a compact disc read only memory (CDROM), a CD recordable (CD-R), a magnetic tape, and a nonvolatile memory card.

Although the functions according to the first to fourth embodiments are realized by the computer that executes the read program codes, they may be realized by an operating system (OS) or the like, running on the computer, which performs part or all of the actual processing based on the program codes.

Furthermore, when the program codes read from the storage medium are written on a memory included in an expansion board incorporated in the computer or an expansion unit connected to the computer, the functions according to the first to fourth embodiments may be realized by the CPU or the like provided on the expansion board or the expansion unit, which performs part or all of the actual processing based on the program codes.

Figure 9:
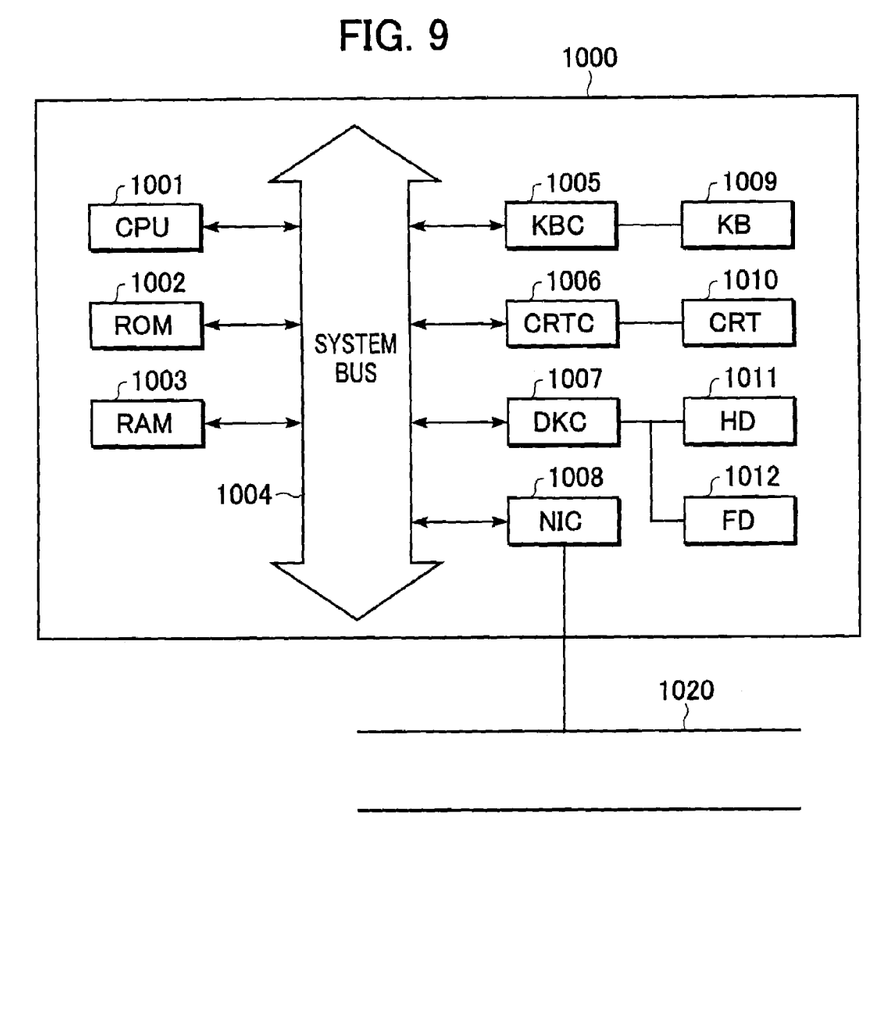
FIG. 9 is a block diagram schematically showing a structure for realizing the function of the image processing apparatuses according to either of the first to fourth embodiments in a computer.

FIG. 9 is a block diagram schematically showing a computer function 1000.

The computer function 1000 includes a CPU 1001, a ROM 1002, a RAM 1003, a keyboard controller (KBC) 1005 of a keyboard (KB) 1009, a cathode ray tube (CRT) controller (CRTC) 1006 of a CRT display (CRT) 1010 serving as a display, a disk controller (DKC) 1007 of a hard disk (HD) 1011 and a flexible disk (FD) 1012, and a network interface controller (NIC) 1008 for connecting to a network 1020, all of which are connected through a system bus 1004 and can communicate with each other.

The CPU 1001 performs overall control of the components connected to the system bus 1004 by executing the software stored in the ROM 1002 or the HD 1011 or the software supplied from the FD 1012.

Namely, the CPU 1001 controls the components to realize the operation according to either of the first to fourth embodiments by reading processing programs following a predetermined processing sequence from the ROM 1002, the HD 1011, or the FD 1012 to execute the programs.

The RAM 1003 functions as a main memory or a work area for the CPU 1001. The KBC 1005 controls instructions input from the KB 1009 or a pointing device (not shown).

The CRTC 1006 controls the display state of the CRT 1010. The DKC 1007 controls access to the HD 1011 and the FD 1012 that store boot programs, various applications, editor files, user files, network control programs, and a predetermined processing program according to either of the first to fourth embodiments. The NIC 1008 interactively exchanges data with an apparatus or a system on the network 1020.

The encoding system for compressing motion pictures is not limited to the MPEG-4 encoding system used in the embodiments described above and an MPEG-1 (ISO/IEC 11172) or an MPEG-2 (ISO/IEC 13818) encoding system may be employed.

As described above, according to the embodiments of the present invention, the display data (finder data) is commonly used for both displaying images and compressing images, hence, the motion pictures compressed in an encoding system other than a motion-JPEG encoding system (for example, MPEG-1, MPEG-2, or MPEG-4 encoding system) can be produced by using a simple image processing apparatus with a general-purpose digital camera IC including a JPEG CODEC.

Additionally, since efficient data transfer can be achieved, for example, memory operating frequency is decreased owing to the reduction of bus traffic when taking motion pictures, thus reducing current consumption.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus comprising:
   an input unit for sequentially inputting image data;
   a display unit for displaying finder image data in the image data sequentially input from the input unit;
   a processing unit that outputs encoded still-image data and the finder image data, the encoded still-image data being generated by compressing and encoding desired image data in the image data;
   an image cutting unit for partly cutting out image data from the finder image data output by said processing unit conforming to a motion-picture format:
   an output unit for outputting the finder image data cut out by said image cutting unit to said display unit; and
   a motion-picture compressing unit for compressing the finder image data cut out by said image cutting unit into compressed and encoded motion-picture data and for outputting the compressed and encoded motion-picture data.

2. An image processing apparatus according to claim 1, further comprising
   a recording unit for selectively recording the encoded still-image data and the compressed and encoded motion-picture data.

3. An image processing apparatus according to claim 1, wherein said output unit outputs to said display unit decompressed image data that is generated by decompressing the compressed and encoded motion-picture data.

4. An image processing apparatus according to claim 1, wherein said input unit includes an imaging unit for imaging an object to sequentially output the imaged data.

5. An image processing apparatus according to claim 1, wherein said processing unit compresses and encodes the image data into still-image data conforming to the JPEG encoding system and said motion-picture compressing unit compresses and encodes the finder image data into motion-picture data conforming to the MPEG-4 encoding system.

6. An image processing method comprising the steps of:
   sequentially inputting image data;
   outputting encoded still-image data that is generated by compressing and encoding desired image data in the image data and finder image data in the image data to be displayed on a display unit;
   partly cutting out image data from the outputted finder image data conforming to a motion-picture format:
   outputting the cut out finder image data to the display unit; and
   compressing the cut out finder image data into compressed and encoded motion-picture data and outputting the compressed and encoded motion-picture data.

7. A program stored on a computer-readable medium causing a computer to execute the steps in the image processing method according to claim 6.

8. A computer-readable storage medium storing a program for causing a computer to execute the steps in the image processing method according to claim 6.

* * * * *

UNITED STATES PATENT AND TRADEMARK OFFICE
CERTIFICATE OF CORRECTION

| | |
|---|---|
| PATENT NO. | : 7,254,274 B2 |
| APPLICATION NO. | : 10/430214 |
| DATED | : August 7, 2007 |
| INVENTOR(S) | : Yoshiyuki Endo |

It is certified that error appears in the above-identified patent and that said Letters Patent is hereby corrected as shown below:

COLUMN 3:

Line 36, "an" should be deleted.

COLUMN 4:

Line 23, "is" should be deleted; and
    Line 53, "for" should read --for the--.

COLUMN 6:

Line 8, "an decompressed" should read --a decompressed--.

COLUMN 7:

Line 16, "480" should be lightface; and
    Line 22, "line" should read --lines--.

COLUMN 8:

Line 38, "and" should read --and the--; and
    Line 44, "and" should read --and the--.

COLUMN 9:

Line 19, "from" should read --from the--; and
    Line 50, "a" should read --an--.

COLUMN 10:

Line 54, "include" should read --includes--; and
    Line 57, "(CDROM)," should read --(CD-ROM),--.

UNITED STATES PATENT AND TRADEMARK OFFICE
CERTIFICATE OF CORRECTION

PATENT NO. : 7,254,274 B2
APPLICATION NO. : 10/430214
DATED : August 7, 2007
INVENTOR(S) : Yoshiyuki Endo

It is certified that error appears in the above-identified patent and that said Letters Patent is hereby corrected as shown below:

<u>COLUMN 11</u>:

Line 45, "images," should read --images;--; and
Line 57, "not" should read --is not--.

Signed and Sealed this

Fifth Day of May, 2009

JOHN DOLL
*Acting Director of the United States Patent and Trademark Office*